Patented Oct. 8, 1929

1,730,665

UNITED STATES PATENT OFFICE

MATTHEW LINDENBERG, OF NEW YORK, N. Y.

ARTICLE OF ORNAMENTATION AND METHOD FOR PREPARING SAME

No Drawing.  Application filed June 16, 1928. Serial No. 286,071.

This invention relates to the art of ornamentation and deals more specifically with an article and the method of producing the same which may be cut to any predetermined figure and which is adapted for attachment to any knitted, woven or felted surface by means of an adhesive which becomes tacky upon the application of heat.

It has been proposed heretofore to provide articles of ornamentation with a backing of gutta-percha so that the article may be placed in position and a heated iron or roller applied for the purpose of rendering the gutta-percha tacky and to cause the article to adhere to the desired surface. This has not been found to be entirely satisfactory for the reason that when the article of ornamentation is of a loosely woven or light material, both as to color and weight, the molten gutta-percha seeps through the fabric causing spots and stains thereon. In so far as I am aware of the prior art, the application of a gutta-percha backing to articles of ornamentation has been restricted to fabrics of a dark color and/or of heavy quality. In accordance with my invention, however, the desired result may be obtained with light colored materials, and also with materials of a loosely woven texture.

The manner in which I carry out my invention will be readily understood from the following description:

A sheet of material having the desired color and texture is first covered with a thin coating of talcum powder or powdered rosin. I thin apply a coating of rubber cement of the kind commercially known as "raincoat rubber cement," and follow this with a second application of talcum powder or powdered rosin, and another application of rubber cement. While the rubber cement is still tacky I apply a thin sheet of gutta-percha or mending tissue.

The sheet of material thus prepared is ready for cutting into the desired shapes. Each article cut from this sheet has the desired properties.

It will be understood that it is within the purview of this invention either to increase or decrease the number of applications of rubber cement and powdered rosin. For example, under certain conditions it might be more advantageous to make a single application of rubber cement of greater thickness than to make more than one application of relatively less thicknses. Also, the amounts of the various materials used will vary in accordance with different fabrics used and with different working conditions. The determining factors as to amounts of materials necessary, are for the rubber cement to be applied thick enough to prevent the molten gutta-percha from going through the fabric; the amount of rosin or talcum powder used to be sufficient to insure proper drying of the rubber cement, and the amount of gutta-percha to be sufficient to insure the proper adhesion of the article when applied in place. I have found that an application of rubber cement which is about 0.25 mm. thickness when dry and a layer of gutta-percha having a thickness of about 0.70 mm. will ordinarily give satisfactory results. The rosin or talcum is dusted on in varying amounts, usually just enough to cover the rubber cement with a layer of rosin dust or talcum.

I do not intend to be limited to the specific details of this disclosure except as defined in the appended claims.

Having thus described my invention, I claim:

1. A laminated fabric comprising a layer of cloth, a layer of rubber cement, a coating of rosin applied thereto, and a layer of gutta-percha attached to said layer of rubber cement.

2. A laminated fabric comprising a layer of cloth, a first layer of rubber cement applied thereto, a first coating of rosin applied to said cement, a second layer of rubber cement applied to said coating, a second coating of rosin applied to said second layer of cement, and a layer of gutta-percha applied to said last mentioned coating attached to said layer of rubber cement.

3. A laminated fabric comprising a layer of cloth, a layer of rubber cement, and a layer of gutta-percha.

4. A laminated fabric comprising a layer of cloth, a first layer of rubber cement applied thereto, a first coating of rosin applied to said cement, a second layer of rubber cement applied to said coating, and a layer of gutta-percha applied to said last mentioned layer.

5. The method of preparing a laminated fabric which comprises coating a cloth material with rubber cement, applying a coating of powdered rosin to said cement, drying said rubber cement, and applying a layer of gutta-percha to said cement coated surface.

6. The method of preparing a laminated fabric which comprises coating a cloth material with rubber cement, applying a coating of powdered rosin to said cement, drying said rubber cement, applying another coating of rubber cement, drying said last mentioned coating, and applying a layer of gutta-percha to said cement coated surface.

7. The method of preparing a laminated fabric which comprises coating a cloth material with rubber cement, applying a coating of powdered rosin to said cement, drying said rubber cement, applying a second coating of rubber cement, applying a second coating of powdered rosin, drying said rubber cement, and applying a layer of gutta-percha.

MATTHEW LINDENBERG.